United States Patent
Song et al.

(10) Patent No.: US 9,631,646 B2
(45) Date of Patent: Apr. 25, 2017

(54) CYLINDER MECHANISM

(71) Applicant: ScienBiziP Consulting(Shenzhen)Co., Ltd., Shenzhen (CN)

(72) Inventors: Wei-Dong Song, Shenzhen (CN); Si-Jing Yang, Shenzhen (CN); Hsu-Min Kuo, New Taipei (TW)

(73) Assignee: ScienBiziP Consulting(Shenzhen)Co., Ltd., Shenzhen (CN)

( * ) Notice: Subject to any disclaimer, the term of this patent is extended or adjusted under 35 U.S.C. 154(b) by 208 days.

(21) Appl. No.: 14/576,831

(22) Filed: Dec. 19, 2014

(65) Prior Publication Data
US 2016/0153480 A1    Jun. 2, 2016

(30) Foreign Application Priority Data
Nov. 28, 2014    (CN) .......................... 2014 1 0701832

(51) Int. Cl.
*F15B 15/24*    (2006.01)
*F16J 10/02*    (2006.01)
*F16J 1/10*    (2006.01)

(52) U.S. Cl.
CPC ................. *F15B 15/24* (2013.01); *F16J 1/10* (2013.01); *F16J 10/02* (2013.01)

(58) Field of Classification Search
CPC ............................. F15B 15/24; F15B 15/1471
USPC ....... 92/13.4, 13.41, 13.5, 13.51, 13.6, 13.7, 92/13.8
See application file for complete search history.

(56) References Cited

U.S. PATENT DOCUMENTS

| | | | | |
|---|---|---|---|---|
| 247,385 A | * | 9/1881 | McGowan | B30B 9/3053 100/219 |
| 2,223,223 A | * | 11/1940 | Muller | B30B 15/18 277/511 |
| 2,442,306 A | * | 5/1948 | McCormick | F15B 15/24 92/118 |
| 4,686,870 A | * | 8/1987 | Mack | B25J 9/101 74/128 |
| 4,736,674 A | * | 4/1988 | Stoll | F15B 15/24 92/13.5 |
| 4,796,456 A | * | 1/1989 | Schmoll | B21J 7/14 72/402 |
| 4,898,080 A | * | 2/1990 | Lieberman | B23Q 1/58 92/110 |
| 5,351,603 A | * | 10/1994 | Yuda | B23Q 37/00 92/128 |

(Continued)

*Primary Examiner* — Thomas E Lazo
(74) *Attorney, Agent, or Firm* — Steven Reiss

(57) ABSTRACT

A cylinder mechanism includes a cylinder body, a piston pole slidably installed to the cylinder body, a connecting member mounted to the piston pole away from the cylinder body, and an adjusting apparatus. The cylinder body includes two tabs protruding out from two side surfaces of the cylinder body. Each tab defines a guiding hole extending along a moving direction of the piston pole. The adjusting apparatus includes two screws and two adjusting nuts fitting about the two screws. A first end of each screw is mounted to the connecting member, and a second end of each screw is passed through the corresponding guiding hole. Each adjusting nut is connected to the second end of the corresponding screw, and the adjusting nut is configured to abut against the corresponding tab. The stroke of the piston pole is configured to adjust according as rotating the adjusting nuts.

14 Claims, 4 Drawing Sheets

(56) References Cited

U.S. PATENT DOCUMENTS 6,305,668 B1 * 10/2001 Edens .................. B66F 3/24
                                                       254/93 R
7,343,849 B2 * 3/2008 Asaba ................ F15B 15/1471
                                                       92/165 R

* cited by examiner

CYLINDER MECHANISM

FIELD

The subject matter herein generally relates to a cylinder mechanism.

BACKGROUND

Cylinders are often used for transporting or positioning a workpiece. The stroke of each cylinder is controlled through sensors with complicated structures.

BRIEF DESCRIPTION OF THE DRAWINGS

Implementations of the present technology will now be described, by way of example only, with reference to the attached figures.

DETAILED DESCRIPTION

Figure 1:
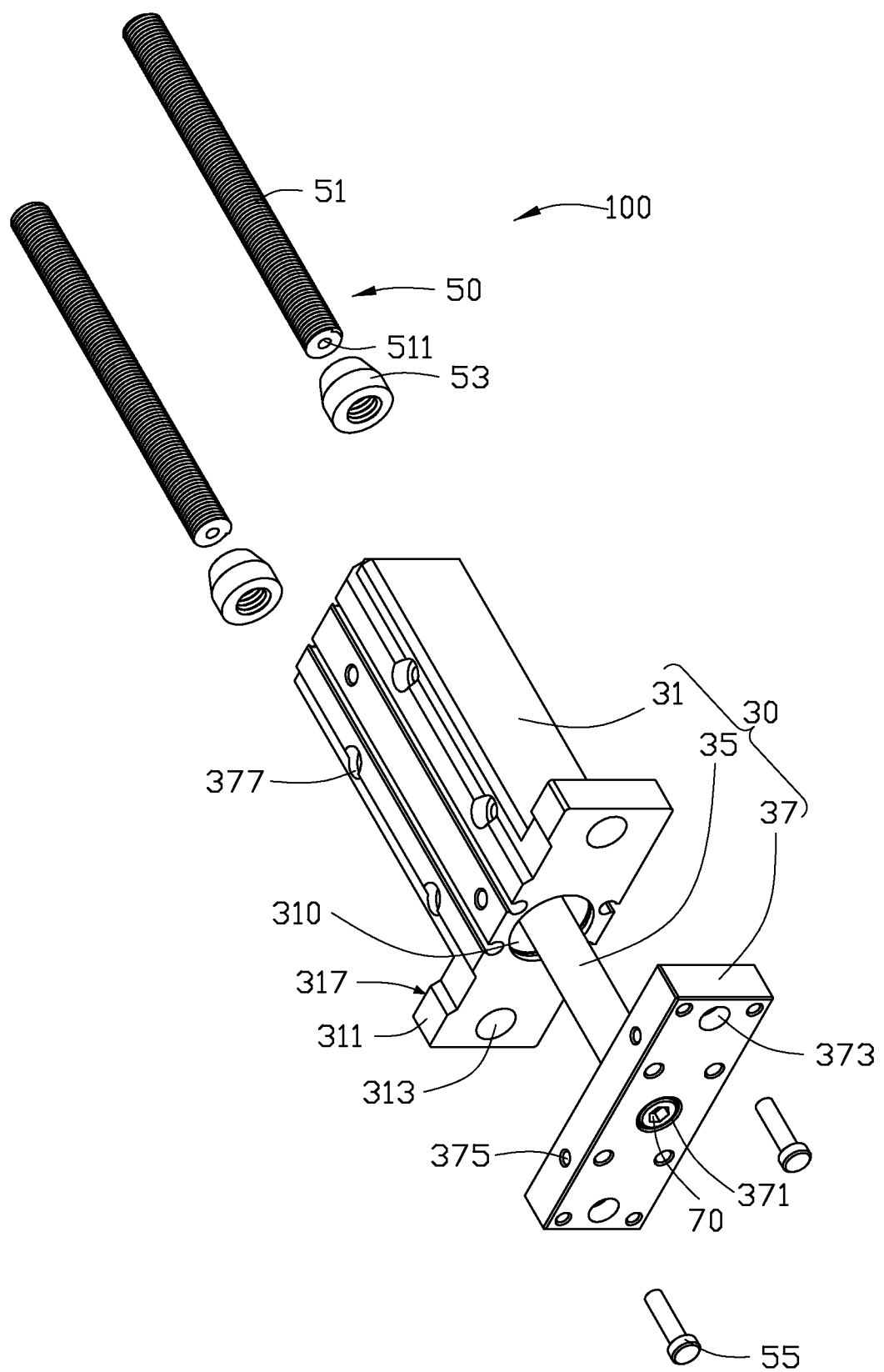
FIG. 1 is an exploded, isometric view of an embodiment of a cylinder mechanism.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "outside" refers to a region that is beyond the outermost confines of a physical object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

The present disclosure is described in relation to a cylinder mechanism.

FIG. 1 illustrates an embodiment of a cylinder mechanism 100 comprising a cylinder assembly 30 and an adjusting apparatus 50.

The cylinder assembly 30 comprises a cylinder body 31 having an aperture 310 formed therein, a piston pole 35 slidably mounted in the aperture 310 of the cylinder body 31, a piston 33 (shown in FIG. 3) connected to an inside first end of the piston pole 35 and received in the cylinder body 31 (shown in FIG. 3), and a connecting member 37 connected to an outside second end of the piston pole 35.

Two tabs 311 extend substantially perpendicular from two opposite side surfaces of an end of the cylinder body 31 adjacent to the connecting member 37. A middle of each tab 311 defines a guiding hole 313 extending along a moving direction of the piston pole 35. An abutting surface 317 is formed on each tab 311 away from the connecting member 37. The second end of the piston pole 35 substantially axially defines a mounting hole 315 (shown as FIG. 3). A middle part of the connecting member 37 defines a countersunk hole 371, and two opposite ends of the connecting member 37 defines two fastening holes 373. The connecting member 37 further defines a plurality of connecting holes 375. The cylinder body 31 defines a plurality of assembly holes 377. In at least one embodiment, each fastening hole 373 is a countersunk hole.

The adjusting apparatus 50 can comprise two screws 51, two adjusting nuts 53 fitting about the screws 51, and two fastening members 55. An outside diameter of each screw 51 is less than a diameter of each guiding hole 313. A length of each screw 51 is greater than the length of the piston pole 35. A first end of each screw 51 substantially axially defines a mounting hole 511. In at least one embodiment, each fastening member 55 is a screw, and each mounting hole 511 is a screw hole.

Figure 2:
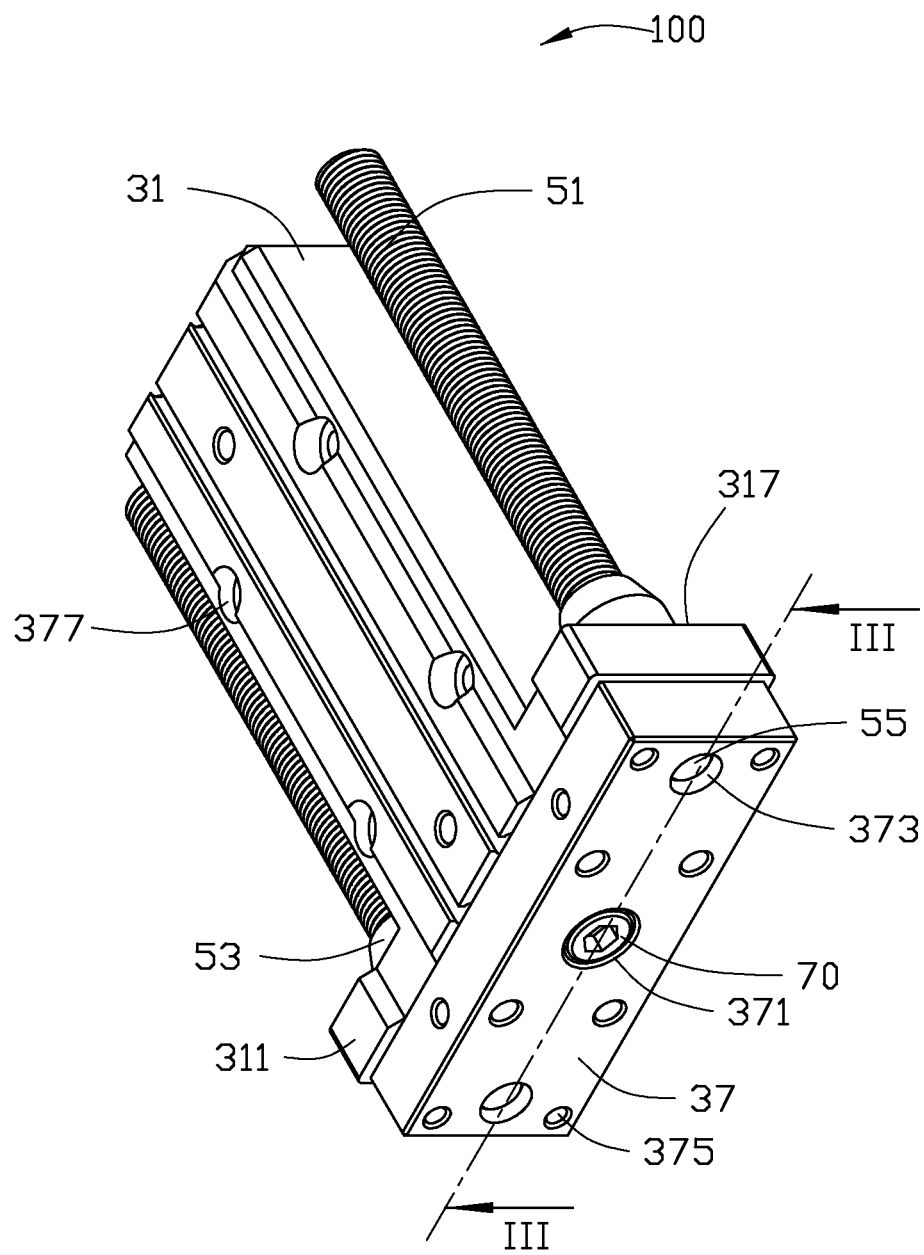
FIG. 2 is an assembled, isometric view of FIG. 1.
Figure 3:
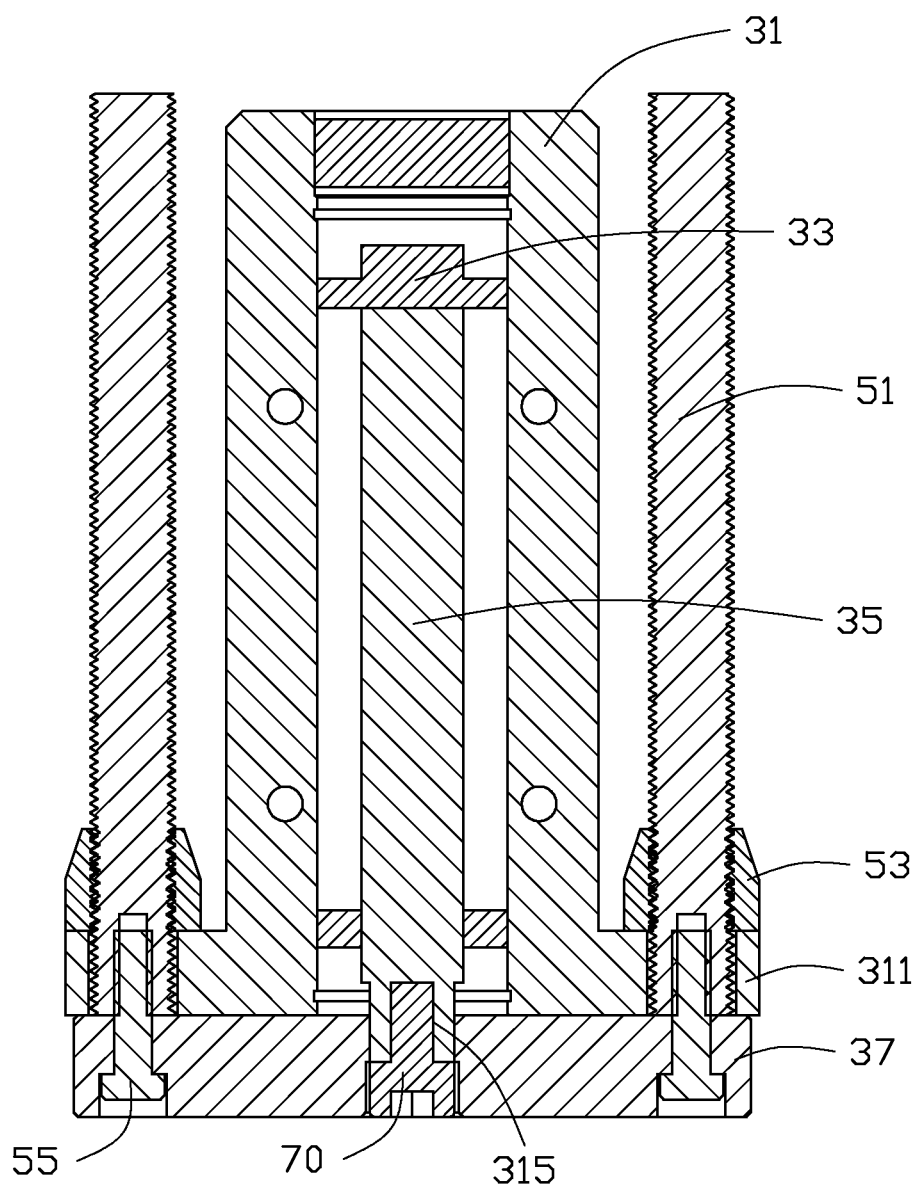
FIG. 3 is a cross-sectional view of FIG. 2, taken along line III-III.

FIGS. 2-3 illustrate that the cylinder mechanism 100 in assembly. The connecting member 37 is placed adjacent to the piston pole 35, and the countersunk hole 371 of the connecting member 37 is aligned with the mounting hole 315 of the piston pole 35. A fastening member 70 extends through the countersunk hole 371, to be mounted in the mounting hole 315 of the piston pole 35. The connecting member 37 is mounted substantially perpendicular to the second end of the piston pole 35, and the fastening holes 373 respectively align with the guiding holes 313 of the tabs 311. The first end of each screw 51 is inserted into the corresponding guiding hole 313, until the first end of the screw 51 abuts against the connecting member 37, and the mounting hole 511 of the screw 51 aligns with the corresponding fastening hole 373. The fastening members 55 are passed through the fastening holes 373, to be mounted in the corresponding mounting holes 511 of the screws 51. The screws 51 are mounted substantially perpendicular to the connecting member 37, each screw 51 can be configured to slide in the corresponding guiding hole 313, and the second end of each screw 51 is exposed out of the corresponding abutting surface 317. The adjusting nuts 53 are respectively fitted about the second ends of the screws 51, and each adjusting nut 53 can be configured to abut against the corresponding abutting surface 317.

Figure 4:
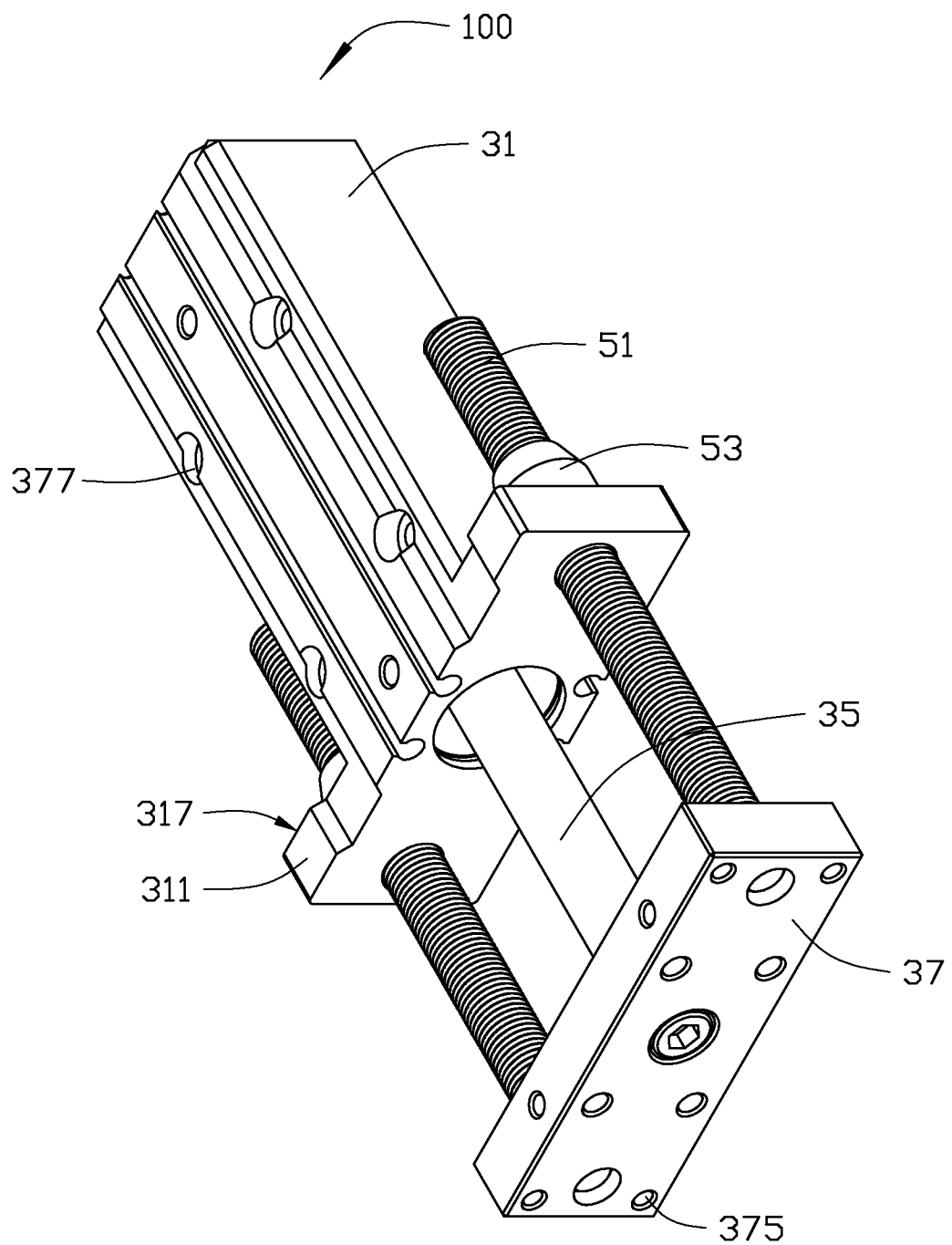
FIG. 4 is similar to FIG. 2, but showing the cylinder mechanism in a state of use.

FIG. 4 illustrates that the cylinder mechanism 100 in use, the cylinder body 31 is mounted an equipment through a plurality of screws (not shown) extending through the assembly hole 377 to be mounted to the equipment. A workpiece (not shown) is connected to the connecting member 37 through the connecting holes 375. A stroke of the piston pole 35 is equal to the actual stroke of the workpiece transporting according to rotate the adjusting nuts 53. The piston 33 moves to slide the screws 51 along the corresponding guiding holes 313, until the adjusting nuts 53 is abutted against the corresponding abutting surfaces 317. If the actual stroke of the workpiece is changed, the adjusting nuts 53 can be rotated to move the adjusting nuts 53 relative to the corresponding screw 51, until the stroke of the piston pole 35 is equal to the actual stroke of the workpiece.

Even though numerous characteristics and advantages of the embodiments have been set forth in the foregoing description, together with details of the structure and function of the embodiments, the present disclosure is illustrative only, and changes may be made in detail, including in the matters of shape, size, and arrangement of parts within the principles of the embodiments to the full extent indicated by the broad general meaning of the terms in which the appended claims are expressed.

What is claimed is:

1. A cylinder mechanism comprising:
a cylinder body having an aperture formed therein and two tabs protruding out from two side surfaces of the cylinder body;
a piston pole slidably installed in the aperture of the cylinder body;
a connecting member mounted to an outside end of the piston pole; and
an adjusting apparatus comprising two screws and two adjusting nuts fitting about the two screws;
wherein each tab defines a guiding hole extending along a sliding direction of the piston pole, a first end of each screw is mounted to the connecting member, and a second end of each screw is slidably passed through the corresponding guiding hole, the adjusting nut is configured to abut against a side of the corresponding tab away from the connecting member, the stroke of the piston pole is adjusted by the adjusting nuts.

2. The cylinder mechanism of claim 1, wherein the tabs perpendicularly protrude from opposite side surfaces of the outer side end of the cylinder body.

3. The cylinder mechanism of claim 1, wherein each guiding hole is defined in a middle of the corresponding tab.

4. The cylinder mechanism of claim 1, wherein an outside diameter of each screw is less than a diameter of the corresponding guiding hole.

5. The cylinder mechanism of claim 1, wherein a length of each screw is greater than a length of the piston pole.

6. The cylinder mechanism of claim 1, wherein the first end of each screw axially defines a mounting hole, the connecting member defines two fastening holes corresponding to the guiding holes of the tabs, two fastening members pass through the fastening holes to be mounted in the corresponding mounting holes of the screws.

7. The cylinder mechanism of claim 1, wherein an outside end of the piston pole axially defines a mounting hole, a middle part of the connecting member defines a countersunk hole opposite to the mounting hole of the piston pole, a fastening member extends through the countersunk hole to be mounted in the mounting hole of the piston pole.

8. A cylinder mechanism comprising:
a cylinder body comprising one tab protruding out from a side surface of the cylinder body;
a piston pole slidably installed in the cylinder body;
a connecting member mounted to an outside end of the piston pole; and
an adjusting apparatus comprising a screw and an adjusting nut fitting about the screw;
wherein the tab defines a guiding hole extending along a moving direction of the piston pole, a first end of the screw is mounted to the connecting member, and a second end of the screw is slidably passed through the guiding hole, the adjusting nut is configured to abut against a side of the tab away from the connecting member, the stroke of the piston pole is adjusted by the adjusting nut.

9. The cylinder mechanism of claim 8, wherein the tab perpendicularly protrudes out from the side surface of the outer side end of the cylinder body.

10. The cylinder mechanism of claim 8, wherein the guiding hole is defined in a middle of the tab.

11. The cylinder mechanism of claim 8, wherein an outside diameter of the screw is less than a diameter of the guiding hole.

12. The cylinder mechanism of claim 8, wherein a length of the screw is greater than a length of the piston pole.

13. The cylinder mechanism of claim 8, wherein the first end of the screw axially defines a mounting hole, the connecting member defines a fastening hole corresponding to the guiding hole of the tab, a fastening member passes through the fastening hole to be mounted in the mounting hole of the screw.

14. The cylinder mechanism of claim 8, wherein an outside end of the piston pole axially defines a mounting hole, a middle part of the connecting member defines a countersunk hole opposite to the mounting hole of the piston pole, a fastening member extends through the countersunk hole to be mounted in the mounting hole of the piston pole.

* * * * *